(12) United States Patent
Peles (10) Patent No.: US 9,749,404 B2
(45) Date of Patent: Aug. 29, 2017

(54) METHOD AND SYSTEM FOR LOAD BALANCING OVER A CLUSTER OF AUTHENTICATION, AUTHORIZATION AND ACCOUNTING (AAA) SERVERS

(75) Inventor: Amir Peles, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 1263 days.

(21) Appl. No.: 12/104,820

(22) Filed: Apr. 17, 2008

(65) Prior Publication Data
US 2009/0265467 A1    Oct. 22, 2009

(51) Int. Cl.
G06F 15/16 (2006.01)
H04L 29/08 (2006.01)
H04L 12/801 (2013.01)
H04L 29/06 (2006.01)

(52) U.S. Cl.
CPC .......... *H04L 67/1036* (2013.01); *H04L 47/10* (2013.01); *H04L 63/0892* (2013.01); *H04L 67/1002* (2013.01); *H04L 67/1017* (2013.01); *H04L 67/1023* (2013.01)

(58) Field of Classification Search
CPC . H04L 63/08; H04L 63/0892; H04L 67/1002; H04L 67/1027; G06F 9/5027
USPC ........................................ 709/200, 226–227
See application file for complete search history.

(56) References Cited

U.S. PATENT DOCUMENTS

| | | | |
|---|---|---|---|
| 6,182,139 B1 * | 1/2001 | Brendel | 709/226 |
| 2003/0195962 A1 * | 10/2003 | Kikuchi et al. | 709/226 |
| 2004/0019680 A1 * | 1/2004 | Chao et al. | 709/226 |
| 2004/0105431 A1 * | 6/2004 | Monjas-Llorente et al. | 370/352 |
| 2005/0005006 A1 * | 1/2005 | Chauffour et al. | 709/223 |
| 2008/0072226 A1 * | 3/2008 | Armes et al. | 718/101 |
| 2008/0195742 A1 * | 8/2008 | Gilfix et al. | 709/230 |

OTHER PUBLICATIONS

Calhoun et al. RFC 3588—Diameter Base Protocol. Sep. 2003. pp. 1-147.*
RFC 2865. Rigney et al. "Remote Authentication Dial in User Service (RADIUS)", Jun. 2000, pp. 1-76.*

* cited by examiner

*Primary Examiner* — John MacIlwinen
(74) *Attorney, Agent, or Firm* — M&B IP Analysts, LLC (57) ABSTRACT

A method and system for load balancing over a cluster of authentication, authorization and accounting (AAA) servers. The method performs a distribution of AAA requests among AAA servers having an active AAA connection with an AAA client. The method includes establishing TCP connections with a plurality of AAA servers, using a TCP connection request received from at least one AAA client; opening AAA connections with a plurality of AAA servers, using an AAA connection request received from at least one AAA client, and distributing AAA requests to AAA servers with an active AAA connection according to a predefined load balancing algorithm. The invention is further capable of multiplexing outbound messages and requests received from a plurality of AAA servers. The AAA protocol supported by the invention includes, but is not limited to, a Diameter protocol, a lightweight directory access protocol (LDAP), and the likes.

14 Claims, 6 Drawing Sheets

| Client-Identifier | Server-Identifier |
|---|---|
| Client connection 1 | Server1 connection 1 |
| | Server2 connection 1 |
| | Server3 connection 1 |
| ... | ... |
| ... | ... |
| ... | |
| Client connection N | Server1 connection N |
| | Server2 connection N |
| | Server3 connection N |

FIG. 4A

| Session-ID | Client-connection-Identifier | Server-connection-Identifier |
|---|---|---|
| | | |

FIG. 4B

| Front-end server | Original-hop-by-hop | Server-hop-by-hop | Backend Server |
|---|---|---|---|
| | | | |

METHOD AND SYSTEM FOR LOAD BALANCING OVER A CLUSTER OF AUTHENTICATION, AUTHORIZATION AND ACCOUNTING (AAA) SERVERS

TECHNICAL FIELD OF THE INVENTION

The present invention relates generally to authentication, authorization and accounting (AAA) servers, and more particularly to providing load balancing over a cluster of AAA servers.

BACKGROUND OF THE INVENTION

Authentication, authorization and accounting (AAA) functions refer to the functions of processing authentication, authorization and accounting of subscribers. AAA functions are often required when a subscriber wants to receive a predetermined service through a network. One technique discussed in the related art to provide AAA functions is through a remote access dial in user service (RADIUS) protocol. The RADIUS of protocol suffers from many disadvantages including scalability, supporting a large number of subscribers that require server-based authentication, and fulfilling the requirements of new technologies, such as wireless networks, mobile internet protocols (IPs) and the others.

To overcome these disadvantages, a new AAA protocol, known as a Diameter protocol, has been defined. The Diameter protocol is an extensible peer-based AAA protocol that provides AAA functions for conventional technologies as well as new technologies. The Diameter is designed as a peer-to-peer architecture, where every network node that implements the Diameter protocol can act as either a client or a server depending on the network deployment.

Figure 1:
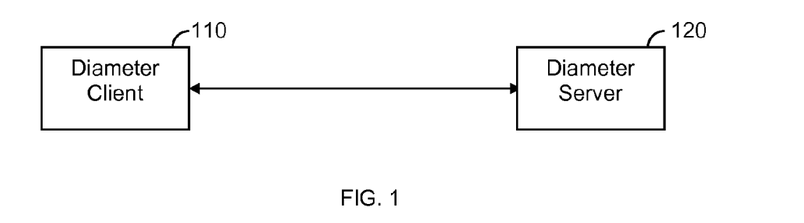
FIG. 1 illustrates the deployment of a Diameter protocol.

The deployment of a typical Diameter protocol is illustrated in FIG. 1. Diameter messages are exchanged between a Diameter client 110 and a Diameter server 120. The Diameter client 110 is a device at the edge of the network that performs access control including, for example, a network access server (NAS) or a foreign agent (FA). The Diameter client 110 generates Diameter requests for authentication, authorization, and/or accounting of subscribers. The Diameter server 120 performs authentication and/or authorization of subscribers according to requests generated by the Diameter client 110.

In order to allow communication between the Diameter client 110 and server 120 a connection is first established between them, where the client and server are exchanging capabilities. Then the client and server communicate through messages, and these messages may be part of multi-message sessions. A Diameter connection is typically established by exchanging CER and CEA messages between the client 110 and server 130. To close a Diameter connection, the client 110 and server 120 exchange disconnection messages, such as a DPR.

Generally, a session is a logical connection between two Diameter nodes and refers to the interactions between a Diameter client 110 and a Diameter server 120 in a given period of time. A session is associated with a client-generated session identification (ID) number that is globally and eternally unique. The session-ID is used to identify a particular session during further communication. The Diameter client 110 and server 120 communicate over a transport protocol, such as a transmission control protocol (TCP) or a stream control transmission protocol (SCTP).

Another example for an AAA protocol that enables enhanced AAA functions is a lightweight directory access protocol (LDAP). The LDAP is an application protocol for querying and modifying directory services running over a TCP. The LDAP generally has the same functionality as the Diameter protocol. In the LDAP communication, a client and a server first bind to each other to establish a connection by exchanging BIND messages (request and reply), and then start exchanging messages. To disconnect, the client and server exchange UNBIND messages.

As network providers continue to increase their services, reliability, scalability and availability become increasingly important. High availability solutions are required to enable subscribers to use the network services and to bill subscribers for using such services during peak-load periods or during device maintenance or failure. That is, there is a need for an efficient solution that enables the continued and reliable operating of AAA services and functions even during peak-load periods, device maintenance or device failures.

SUMMARY OF THE INVENTION

The invention includes a method for load balancing over a cluster of authentication, authorization and accounting (AAA) servers. The method comprises receiving AAA connection establishment requests; forwarding the AAA connection establishment requests to all AAA servers in the cluster of AAA servers; receiving AAA requests; and forwarding each of the AAA requests to one of the AAA servers in the cluster of AAA servers.

The invention also includes a computer program product including a computer-readable medium comprising software instructions operable to enable a computer to perform a method for load balancing over a cluster of authentication, authorization and accounting (AAA) servers. The program product causes a computer to execute the processes of receiving AAA connection establishment requests; forwarding the AAA connection establishment requests to all AAA servers in the cluster of AAA servers; receiving AAA requests; and forwarding each of the AAA requests to one of the AAA servers in the cluster of AAA servers.

The invention also includes a method for multiplexing authentication, authorization and accounting (AAA) requests. The method comprises establishing an AAA connection with a destination AAA server; receiving AAA requests from a plurality of source AAA servers to the destination AAA server; and forwarding the AAA requests received from the plurality of source AAA servers over the AAA connection to the destination AAA server.

The invention also includes a computer program product including a computer-readable medium comprising software instructions operable to enable a computer to perform a method for multiplexing authentication, authorization and accounting (AAA) requests. The program product causes a computer to execute the processes of establishing an AAA connection with a destination AAA server; receiving AAA requests from a plurality of source AAA servers to the destination AAA server; and forwarding the AAA requests received from the plurality of source AAA servers over the AAA connection to the destination AAA server.

The invention also includes an apparatus for load balancing over a cluster of authentication, authorization and accounting (AAA) servers. The apparatus comprises a splitting engine for managing an AAA connection between an AAA client and AAA servers in the cluster of AAA servers, wherein the spitting engine is further capable of forwarding AAA requests over the AAA client connection to at least two AAA servers in the cluster of AAA servers; and a switching engine for sending AAA requests and messages received from the AAA client to the splitting engine.

The invention also includes an apparatus for load balancing over a cluster of authentication, authorization and accounting (AAA) servers. The apparatus comprises an active splitting engine for managing an AAA connection between an AAA client and AAA servers in the cluster of AAA servers, wherein the spitting engine is further capable of forwarding AAA requests over the AAA client connection to at least two AAA servers in the cluster of AAA servers; a backup splitting engine for backing up the active splitting engine; an active switching engine for sending AAA requests and messages received from the AAA client to the splitting engine; and a backup switching engine for backing up the active switching engine.

The invention also includes an authentication, authorization and accounting (AAA) system. The system comprises a cluster of AAA servers, wherein each AAA server is capable of performing authentication, authorization and accounting functions according to the AAA requests; and a load balancer for distributing AAA requests among a plurality of AAA servers in the cluster of AAA servers, wherein the AAA requests are received over an AAA connection.

These and other aspects, features and advantages of the present invention will become apparent from the following description of non-limiting exemplary embodiments, which is to be read in connection with the accompanying drawings.

DETAILED DESCRIPTION OF THE INVENTION

Figure 2:
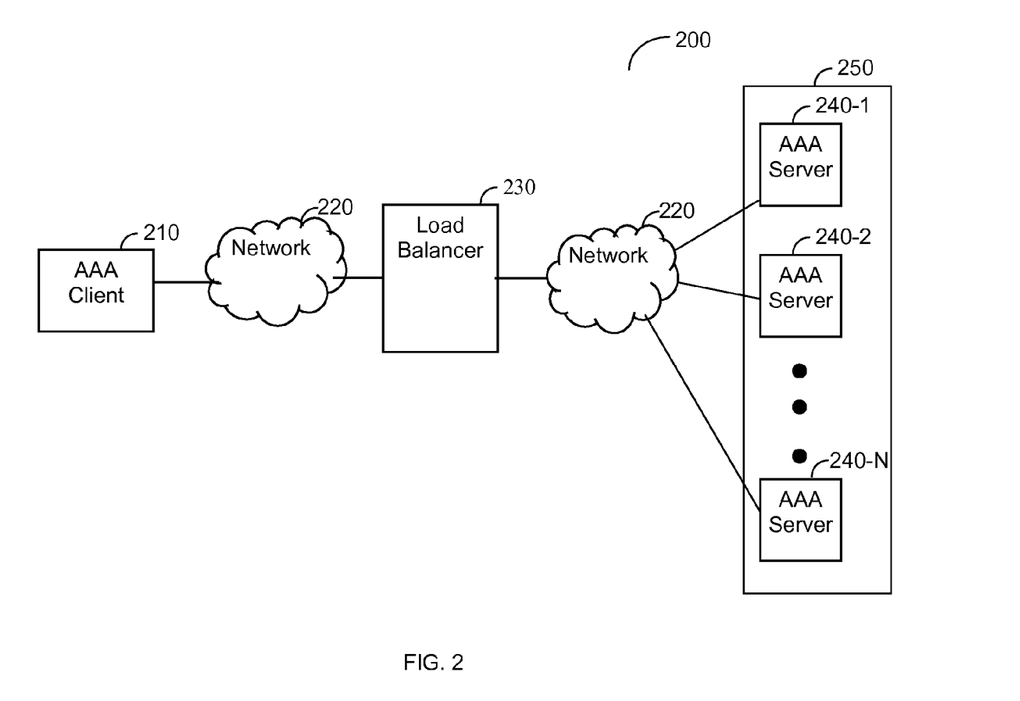
FIG. 2 illustrates the deployment of the load balancer implemented in accordance with an embodiment of the invention.

FIG. 2 shows an exemplary and non-limiting diagram of a network system 200 illustrating the deployment of a load balancer implemented in accordance with an embodiment of the invention. The network system 200 includes at least one AAA client 210, a network 220, a load balancer 230, and a cluster 250 of a plurality of AAA servers 240. The load balancer 230 communicates with both the AAA client 210 and AAA servers 240 through the network 220 which supports data transfer using a transport protocol including, but not limited to, a transmission control protocol (TCP), a stream control transmission protocol (SCTP), and the likes. The network 220 may be, but is not limited to, a local area network (LAN), a wide area network (WAN), a metropolitan area network (MAN), or any combination thereof.

The AAA client 210 sends requests to the AAA servers 240 through the load balancer 230. The AAA servers 240 perform authentication, authorization, and/or accounting functions according to requests generated by the AAA client 210. In accordance with one embodiment the AAA client 210 is a Diameter client, the AAA servers 240 are Diameter servers, and the client and servers support the Diameter protocol. In accordance with another embodiment the AAA client 210 is a LDAP client, the AAA servers 240 are LDAP servers, and the client and servers support the LDAP.

The load balancer 230 is installed in the line of traffic between the AAA client 210 and servers 240 and performs load balancing over the plurality of AAA servers 240. With this aim, the load balancer 230 manages TCP connections, sessions and AAA connections, and distributes AAA requests, as received from the AAA client 210, to the AAA servers 240 according to a predefined load balancing algorithm. The load balancing algorithm may be, but is not limited to, a round robin, a weighted round robin, weighted sessions (i.e., weighted according to the number of active sessions each server has with a client, weighted requests (i.e., weighted according to the number of current requests handled by each server), and so on.

Figure 3:
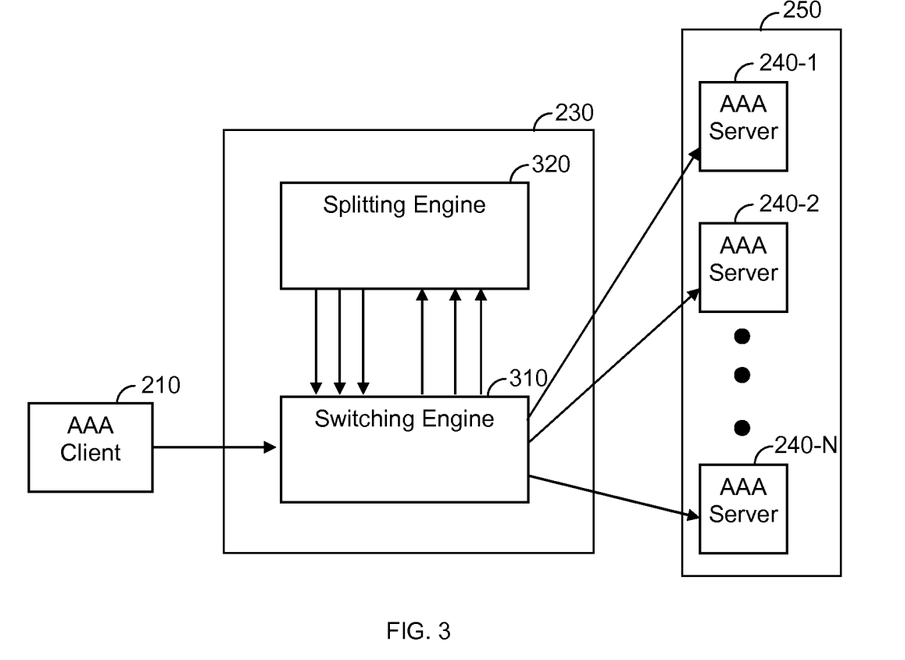
FIG. 3 is a block diagram of the load balancer implemented in accordance with an embodiment of the invention.

FIG. 3 shows a non-limiting and exemplary block diagram of the load balancer 230 implemented in accordance with an embodiment of the invention. The load balancer 230 comprises at least a switching engine 310 and a splitting engine 320. The switching engine 310 is configured with a virtual IP (VIP) address that is used by the AAA client 210 to access the AAA servers 240. The switching engine 310 also sends incoming requests and messages to the splitting engine 320 and continually monitors the health of the AAA servers 240 as well as the connections established with them.

In accordance with one embodiment of the invention the health monitoring is performed by initiating a TCP connection with each of the AAA servers 240, sending a request message (e.g., a CER message or a BIND request) for establishing an AAA connection, waiting for a response message (e.g., a CEA message or a BIND response), checking the correctness of the response, and closing the AAA and TCP connections with server(s) 240 using, for example, a DPR or a UNBIND message. The load balancer 230 can potentially send any additional application message (e.g. a LIR message or a Search message), receive a response, and check the correctness of the response in order to verify the operation of the AAA service 240.

The switching engine 310 controls the dispatching of AAA messages, and selectively applies limitations to the amounts of messages forwarded in the system to protect each of the servers from overload. In addition, it applies security checks to the messages using access rules and data patterns to specify invalid message content and block such messages from reaching the AAA servers.

The splitting engine 320 executes at least the tasks of opening and closing TCP connections, opening and closing AAA connections, and distributing AAA requests among the servers 240. Specifically, the splitting engine 320 upon receiving a request to open a TCP connection from the AAA client 210, opens multiple TCP connections on behalf of the client 210 with one or more available AAA servers 240, one connection per each server 240 and client 210. Thereafter, a message (e.g., a CER message or a BIND message) for establishing an AAA connection sent from the AAA client 210 to the VIP is forwarded to each server 240 that has an active TCP connection. Subsequently, AAA requests sent from the client 210 are distributed to the servers 240 with an active AAA connection according to one of the load balancing algorithms mentioned above, with a single AAA server 240 selected to handle each message from the client 210.

If the splitting engine 320 cannot open an AAA connection with one of the servers 240, the engine 320 periodically tries to reopen a connection with that server. If the client terminates the AAA connection (e.g., using a DPR message or an UNBIND message) the splitting engine 320 terminates all the connections with the servers 240 on behalf of the client 210. In addition, if a server 240 terminates an AAA connection with the client 210, the splitting engine 320 closes that AAA connection with the server 240. As long as other servers are still connected to the splitting engine 320, the engine periodically tries to establish a new AAA connection with that server on behalf of the client 240. If no other servers are connected to the splitting engine 320, the engine terminates the AAA connection with the client 210 as well. While distributing the AAA messages between the AAA servers 240, the splitting engine 320 further guarantees persistent distribution of messages of a particular AAA session to the same AAA server.

Figure 4A:
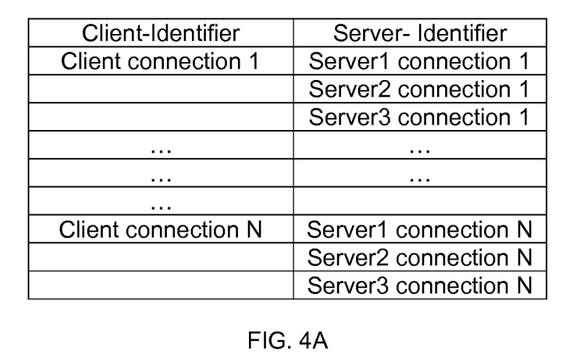
FIG. 4A is an example of the AAA connection table.

The splitting engine 320 includes a memory unit (not shown) for maintaining at least an "AAA connection table" and a "session-tracking table". The AAA connection table holds information about a client connection and the server connections associated with the client connection. As shown in FIG. 4A the AAA connection table includes at least the following fields: a client connection identifier and a list of server connection identifiers, listing all the connections to the AAA servers that were opened on behalf of that client connection. The session-tracking table is used to match between an AAA session-ID and one of the AAA servers 240 that was selected to serve the session. An exemplary session-tracking table is provided in FIG. 4B. The table includes at least the following fields: an AAA session-ID, a client connection identifier, a server connection identifier. For example, the client and server connection identifiers can be their respective IP addresses, or the full TCP/SCTP connection information.

The splitting engine 320 adds a new entry to the AAA connection table upon receiving a TCP SYN request or a CEA or BIND message from a client 210. The splitting engine 320 updates the client connection information based on the client details and attempts to open AAA connections with the servers 240. When succeeding, the splitting engine updates the server connection list with the details of each server connection. When an AAA request is received from the client 210, the splitting engine 320 selects one of servers 240 designated in the AAA connection table as having an active connection with the client 210. Thereafter, the request is sent to the selected server. The selection is made according to a predefined load balancing algorithm. It should be noted that requests belonging to a single AAA connection may be distributed between two or more servers.

Upon termination of an AAA connection with the server, the splitting engine 320 removes the server connection ID from the connection list associated to the client connection in the AAA connection table. The splitting engine 320 removes an entry from the AAA connection table if the connection with a client 210 is terminated, or the server connection list gets empty. The splitting engine 320 identifies the session termination by inspecting the traffic (e.g., identifying a DPR message to close a Diameter connection, an UNBIND message to close a LDAP connection, or a request to close a TCP connection or a SCTP stream).

The splitting engine 320 implements an aging process to remove entries from the AAA connection table if a termination message does not arrive. This aging process uses a predefined time interval of inactivity. Once an AAA client connection and all associated AAA server connections are inactive for such a period, the splitting engine 320 may perform any combination of the following activities: a) sending a message on each of the connections to guarantee the connection is alive (e.g., sending a DWR message and expect a successful DWA message); b) closing the connection using a DPR, UNBIND TCP RST messages; and c) removing all the connections from its AAA connection table.

Figure 4B:
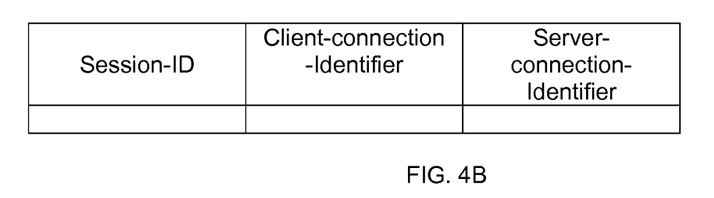
FIG. 4B is an example of the session-tracking table.

The splitting engine 320 further parses each incoming AAA request and identifies the session-ID in the request, whenever it exists. For each identified session-ID, the splitting engine 320 searches the session-tracking table to determine if the session-ID already exists in the table. If the session-ID is not found, the splitting engine 320 selects a server 240 with an active AAA connection to send the request to that selected server. The selection is performed using a predefined load balancing algorithm. Then, an entry in the session-tracking table is added to include the session ID and the AAA server connection identifier. If the session-ID already exists in the session-tracking table, the request is forwarded through the AAA server connection designated in the table.

The splitting engine 320 also implements aging and removal processes to remove entries from the session-tracking table. Specifically, the aging process deletes an entry from the session-tracking table upon an inactivity of the session (i.e., no messages that related to the session ID) for a predetermined time interval. The AAA messages may also specify the aging time interval of a session as part of the AAA session establishment. The splitting engine 320 identifies that time interval by parsing the AAA messages, and replaces the aging time interval with a predefined time interval. The splitting engine 320 removes the session entry from the table upon reception of a termination message either from the client 210 or one of the servers 240. The termination message may be, for example, a Diameter STR message to close a Diameter session.

It would be apparent to a person skilled in the art that the functions performed by the switching engine 310 may be also performed by the splitting engine 320 and in such configuration the load balancer 230 may include only the engine 320.

Figure 5:
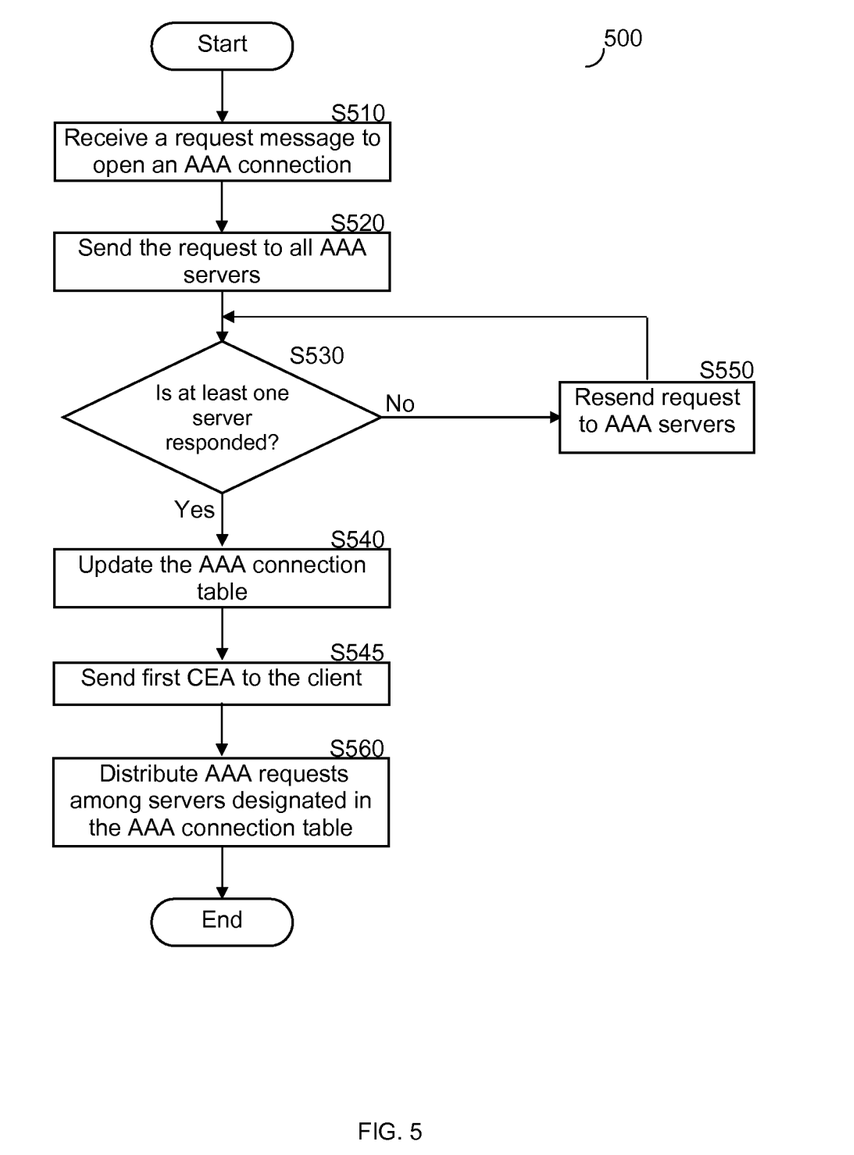
FIG. 5 is a flowchart describing the method for load balancing over a plurality of AAA servers.

FIG. 5 shows a non-limiting and exemplary flowchart 500 describing the method for load balancing over a cluster of AAA servers, implemented in accordance with one embodiment of the invention. The method will be described with reference to a specific embodiment where the AAA client 210 is a Diameter client and the AAA servers 240 are Diameter servers which perform the AAA functions according to the Diameter protocol.

Execution begins when a TCP connection is established between the client 210 and load balancer 230. Then, one or more Diameter connections are established between the Diameter client and the Diameter server(s). Specifically, at step S510 the load balancer 230 receives a CER message, sent from the Diameter client, to open a Diameter connection. At S520, the message is forwarded to all Diameter servers having an active connection with the load balancer 230. At S530, it is determined if at least one of the servers responds with a valid CEA message, and if so execution continues with S540 where a new entry is added to the AAA connection table. The new entry includes the identifier of the client connection which sent the CER message and a list including the server connection that first responded with a CEA message. In addition, at S545 the first valid CEA message is sent to the Diameter client. It should be noted that for each subsequent CEA message received from a subsequent Diameter server this entry is updated in the AAA connection table to include the subsequent Diameter server in the server connection list associate to the client connection.

If step S530 results with a 'No' answer, execution continues with S550 where the load balancer 230 resends the CER message to all Diameter servers 240 that did not approve the CER. Then, execution returns to S530. If none of the servers respond with a valid CEA within a predefined time interval, the connection with the Diameter client is disconnected, and then execution terminates.

At S560, Diameter requests received from the client are distributed to Diameter servers having an active connection with the client. Specifically, the distribution of requests is performed according to a predefined load balancing algorithm and only among Diameter server connections that associated with the client in the AAA connection table. It should be noted that as requests are independent, the load balancer 230 may send each request to different Diameter servers even if the requests arrive on the same Diameter/TCP connection and associated to a single CER message. It should be further noted that for each request sent to a Diameter server, the load balancer 230 expects to receive an acknowledgement message (e.g., a TCP ACK) from the server. Failing to receive such message will cause the load balancer 230 to retransmit the request. If the AAA server does not respond with an acknowledgement message after a predefined time interval, the connection with the server is terminated and the load balancer 230 forwards the request to another active server.

In accordance with another embodiment of the invention the distribution of Diameter requests may be performed using the session tracking table. In this embodiment, the load balancer identifies a session-ID in an incoming request and searches in the session tracking table for an entry that includes the session-ID. If such entry was found, the request is forwarded to the Diameter server designated in the table. If the session-ID is not found, a Diameter server is selected as described at S650. Then, an entry in the session-tracking table is added to include the session ID and the identifier of the selected server.

It would be apparent to a person skilled in the art that the method described herein can be easily adapted to support other types of AAA protocols. Specifically, in accordance with an embodiment of the invention the method can be implemented to support the LDAP. In this embodiment the TCP connections by the load balancer 230 are established as discussed above. The load balancer expects a LDAP BIND message from a client connection to begin the process. To open LDAP connections with the LDAP servers the load balancer 230 sends the BIND message to all available LDAP servers. Upon establishment of one or more LDAP connections, requests received from the LDAP client are distributed to servers with an active LDAP connection. The distribution of requests is performed according to a predefined load balancing algorithm.

The LDAP allows canceling a request sent to a particular server using an Abandon request. With this aim, upon receiving an Abandon request the load balancer 230 either distributes the Abandon request to all LDAP servers with an active LDAP connection or sends the abandon request to the server designated in the Abandon request.

To close the LDAP connection, the client sends an UNBIND message to the load balancer 230 which forwards the requests to all LDAP servers with an active connections. The information regarding active LDAP connections is kept in the AAA connection table.

Figure 6:
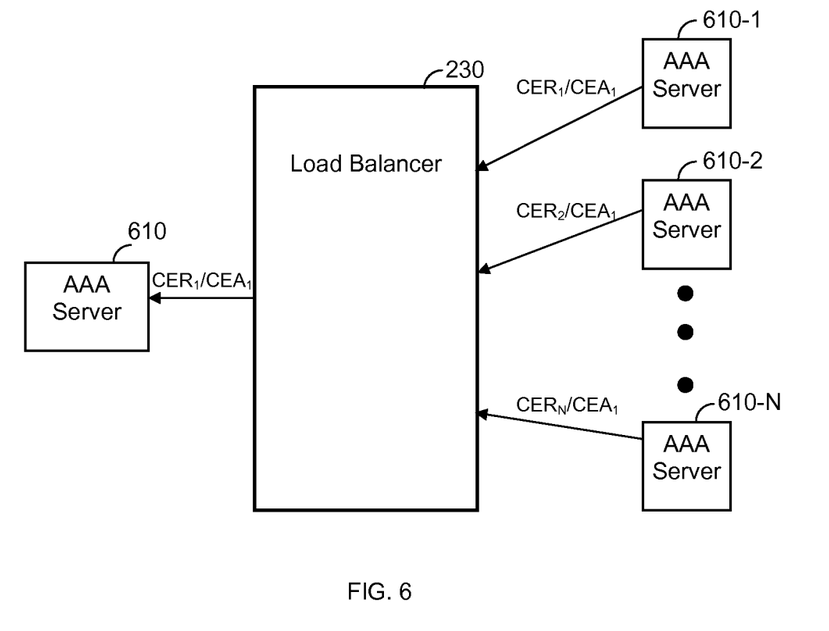
FIG. 6 illustrates the process of multiplexing outbound messages by the load balancer implemented in accordance with an embodiment of the invention.

In accordance with another embodiment of the invention the load balancer 230 is capable of handling outbound messages and requests sent from AAA servers. Specifically, as illustrated in FIG. 6, a plurality of (source) AAA servers 610 transmit requests to a single (destination) AAA server 640. That is, the AAA servers 610 act as clients. Such configuring is utilized when, for example, the servers 610 have to communicate with an external server in order to authenticate the users connecting to them. In this embodiment of the invention, the load balancer 230 multiplexes messages and requests sent from the AAA servers 610 and directed to the AAA server 640. In order to enable the multiplexing of messages and requests, the load balancer 230 maintains only a single TCP connection with the server 640, while TCP connections with the AAA servers 610 are multiplexed. The information regarding which AAA servers 610 have an active connection with the AAA server 640 is kept in the AAA connection table.

To open an AAA connection between each server 610 and a server 640, a message for opening an AAA connection (e.g., a CER message or a BIND message) is sent from each server 610. The load balancer 230 forwards to the server 640 a first received message for opening an AAA connection. Upon receiving a response message (e.g., a CEA message or a BIND response) from the server 640, this message is kept in the AAA connection table and sent to the server 610 that generated the first CER. Thereafter, upon receiving additional request messages for opening AAA connections with the server 640, for each request message, the load balancer 230 modifies the response message (saved in the AAA connection table) according to the attributes in the request message and sends the modified response message to the respective server 610. As illustrated in FIG. 6, the pair of $CER_1/CEA_1$ messages used to establish a connection between the AAA server 610-1 and the AAA server 640. The subsequent request messages $CER_2$, $CER_3$, and CERN respectively sent from AAA servers 610-2, 610-3 and 610-N are acknowledged with the response message $CEA_1$.

Figure 4C:
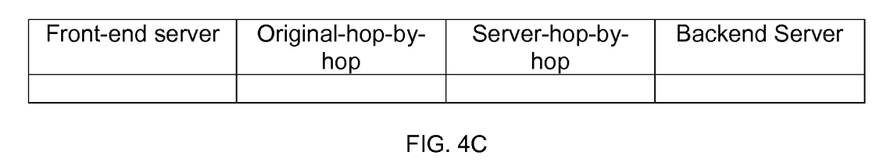
FIG. 4C is an example of the hop-by-hop table.

As mentioned above, AAA requests sent from the servers 610 are multiplexed and forwarded to the server 640. For each such request the load balancer 230 replaces a "hop-by-hop" identifier in the request with a unique identifier "server-hop-by-hop". For a response sent from the server 640 the "server-hop-by-hop" identifier in the response is replaced with the original "hop-by-hop" value. The mapping information between a "server-hop-by-hop" value and the original "hop-by-hop" value or the AAA server 610 that generated the "hop-by-hop" value is either static or maintained in a table in the memory unit of the load balancer 230. An example for such a hop-by-hop table is provided in FIG. 4C, where the front-end server is the server 640 and the back-end server is a server 610. The "server-hop-by-hop" may also be the same as the "hop-by-hop" value received from the server 610. For LDAP messages, the load balancer uses the LDAP "MessageID" for manipulating "MessageID" in requests sent from the servers 610 and the response sent from the server 620.

Figure 7:
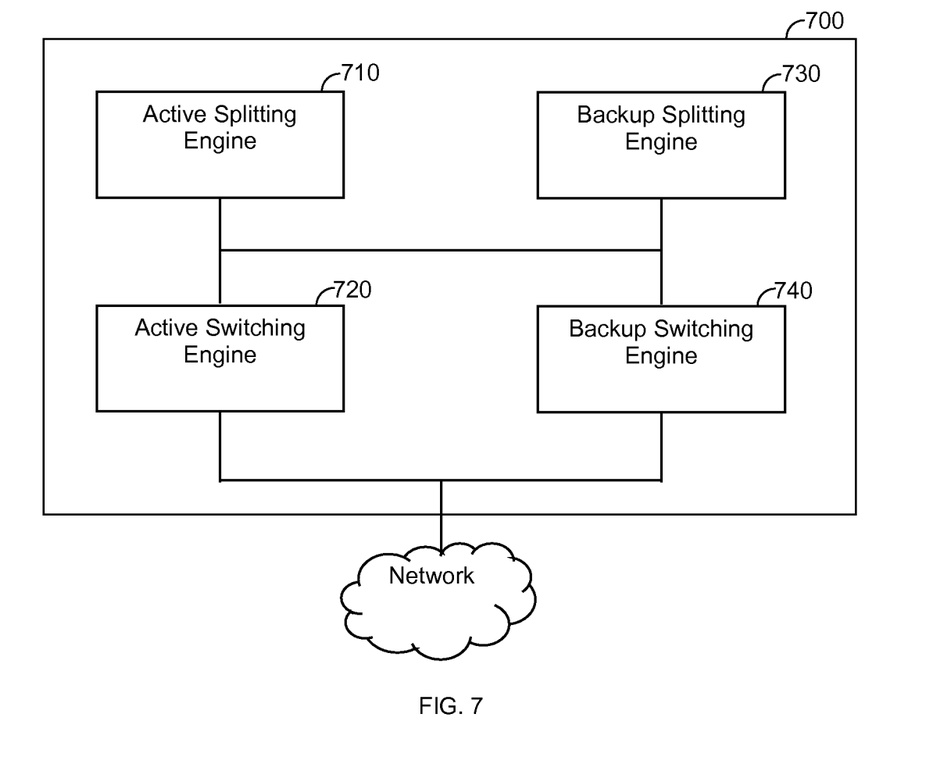
FIG. 7 is a block diagram of the load balancer constructed to provide connection redundancy in accordance with another embodiment of the invention.

FIG. 7 shows a non-limiting an exemplary block diagram of a load balancer 700 constructed to provide connection redundancy in accordance with an embodiment of the invention. The load balancer 700 includes an active splitting engine 710 and an active switching engine 720, having the same functionality described in greater detail above. The load balancer 700 further includes a backup splitting engine 730 and a backup switching engine 740 which designed to takeover the functions of the active splitting engine 710 and switching engine 720 in an event of predefined conditions. These conditions may include failure or overload or a failure of at least one of the active components.

Specifically, in a normal operation, i.e., when both active components properly operate, the active switching engine 720 routes the requests for TCP and AAA connections to the active spitting engine 710. In an event of predefined conditions the active switching engine 720 routes this information to the backup splitting engine 730. If the active switching engine 720 fails, the backup switching engine 740 takes over its functions. The backup switching engine 740 may communicate with the active splitting engine 710 or the backup splitting engine 730. The method for providing connection resiliency is described in greater detail in U.S. patent application Ser. No. 11/943,513 assigned to the common assignee, herein incorporated by reference in its entirety.

The foregoing detailed description has set forth a few of the many forms that the present invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the present invention are implemented as a combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method for load balancing over a cluster of authentication, authorization and accounting (AAA) servers that is performed by a load balancer located between an AAA client and the AAA servers, comprising:
  receiving an AAA connection establishment request from the AAA client;
  forwarding the AAA connection establishment request, received from the AAA client, to more than one AAA server in the cluster of AAA servers, wherein the AAA servers are any of LDAP servers and Diameter servers;
  receiving an AAA connection establishment answer from two or more of the AAA servers, wherein each received AAA connection establishment answer indicates that an active AAA connection has been established with the respective answering AAA server on behalf of the AAA client;
  responding to the AAA client with a received AAA connection establishment answer;
  forwarding an AAA request received from the AAA client to one of the AAA servers, having an active AAA connection with the AAA client, over the active AAA connection, wherein forwarding the AAA request further comprises:
    identifying a session identifier (ID) included in the received AAA request, wherein the AAA request uniquely identifies a session between the AAA client and an AAA server at an AAA protocol layer; and
    forwarding the AAA request to an AAA server associated with the session ID.

2. The method of claim 1, wherein establishing the AAA connection further comprises:
  saving in a connection table for the AAA client an identifier of each AAA server having an active AAA connection with the AAA client.

3. The method of claim 2, wherein forwarding the AAA request further comprises:
  forwarding the AAA request to one of the AAA servers having an identifier in the connection table.

4. The method of claim 2, wherein forwarding the AAA request further comprises:
  searching for the session ID in a session-tracking table;
  forwarding the request to an AAA server associated with the session ID in the session-tracking table;
  when the session ID is not found in the session-tracking table selecting one of the AAA servers designated in the connection table;
  updating the session-tracking table to include the session ID and the selected AAA server; and
  forwarding the request to the selected AAA server.

5. The method of claim 1, wherein the one of the AAA servers to which the AAA request is forwarded is being selected according to a load balancing algorithm, wherein the load balancing algorithm comprises at least one of: a round robin, a weighted round robin, weighted sessions, and weighted requests.

6. The method of claim 1, wherein the AAA servers are Diameter servers and the AAA requests are Diameter requests.

7. The method of claim 6, wherein the AAA connection establishment request is at least a Diameter CER message.

8. The method of claim 1, wherein the AAA servers are lightweight directory access protocol (LDAP) servers and the AAA requests are LDAP requests.

9. The method of claim 8, wherein the AAA connection establishment request is at least a LDAP BIND message.

10. The method of claim 1, wherein the AAA request is sent over the AAA connection using a transport protocol, wherein the transport protocol includes at least one of: a transmission control protocol (TCP) and a stream control transmission protocol (SCTP).

11. A non-transitory computer-readable medium having stored thereon computer executable instructions operable to enable, when executed, a computer to perform a method for load balancing over a cluster of authentication, authorization and accounting (AAA) servers, the method being performed by a load balancer located between an AAA client and the AAA servers, comprising:
  receiving an AAA connection establishment request from the AAA client;
  forwarding the AAA connection establishment request, received from the AAA client, to more than one AAA server in the cluster of AAA servers, wherein the AAA servers are any of LDAP servers and Diameter servers;
  receiving an AAA connection establishment answer from two or more of the AAA servers, wherein each received AAA connection establishment answer indicates that an active AAA connection has been established with the respective AAA server on behalf of the AAA client;

responding to the AAA client with a received AAA connection establishment answer; and forwarding an AAA request received from the AAA client to one of the AAA servers, having an active established AAA connection with the AAA client, over the AAA connection, wherein forwarding the AAA request further comprises:

identifying a session identifier (ID) included in the received AAA request, wherein the AAA request uniquely identifies a session between the AAA client and an AAA server at an AAA protocol layer; and forwarding the AAA request to an AAA server associated with the session ID.

12. An authentication, authorization and accounting (AAA) system, comprises:

a cluster of AAA servers, wherein each AAA server includes a processor and is capable of performing authentication, authorization and accounting functions according to the AAA requests wherein the AAA servers are any of LDAP servers and Diameter servers; and a load balancer located between an AAA client and the AAA servers for distributing AAA requests among a plurality of AAA servers in the cluster of AAA servers and being configured to:

receive an AAA connection establishment request from the AAA client;

forward the AAA connection establishment request, received from the AAA client, to more than one AAA server in the cluster of AAA servers, wherein the AAA servers are any of LDAP servers and Diameter servers;

receive an AAA connection establishment answer from two or more of the AAA servers, wherein each received AAA connection establishment answer indicates that an active AAA connection has been established with the respective AAA server on behalf of the AAA client;

respond to the AAA client with a received AAA connection establishment answer; and forward an AAA request received from the AAA client to one of the AAA servers, having an active AAA connection with the AAA client, over the active AAA connection, wherein the load balancer is further configured to identify a session identifier (ID) included in the received AAA request, wherein the AAA request uniquely identifies a session between the AAA client and an AAA server at an AAA protocol layer; and forward the AAA request to an AAA server associated with the session ID.

13. The system of claim 12, wherein is further configured to:

save in a connection table for the AAA client an identifier of each AAA server having an active AAA connection with the AAA client.

14. The system of claim 13, the load balancer is further configured to:

select one of the AAA servers designated in the connection table when the session ID is not found in the session-tracking table;

update the session-tracking table to include the session ID and the selected AAA server; and forward the request to the selected AAA server.

* * * * *